United States Patent
Nable et al.

(10) Patent No.: US 12,545,997 B2
(45) Date of Patent: Feb. 10, 2026

(54) IN-SITU SOLID CHEMICAL VAPOR DEPOSITION PRECURSOR DELIVERY

(71) Applicant: Raytheon Technologies Corporation, Farmington, CT (US)

(72) Inventors: Jun Nable, Hamden, CT (US); Ying She, Rocky Hill, CT (US); Olivier H. Sudre, Glastonbury, CT (US)

(73) Assignee: RTX Corporation, Farmington, CT (US)

( * ) Notice: Subject to any disclaimer, the term of this patent is extended or adjusted under 35 U.S.C. 154(b) by 547 days.

(21) Appl. No.: 17/888,757

(22) Filed: Aug. 16, 2022

(65) Prior Publication Data

US 2024/0060178 A1    Feb. 22, 2024

(51) Int. Cl.
    *C23C 16/448*    (2006.01)
    *C23C 14/24*     (2006.01)
    *C23C 16/34*     (2006.01)

(52) U.S. Cl.
    CPC .......... *C23C 16/448* (2013.01); *C23C 14/243* (2013.01); *C23C 16/34* (2013.01); *C23C 16/4481* (2013.01); *C23C 14/246* (2013.01)

(58) Field of Classification Search
    CPC ................. C23C 16/4481; C23C 14/243–246
    USPC ....................................................... 118/726
    See application file for complete search history.

(56) References Cited

U.S. PATENT DOCUMENTS

| | | |
|---|---|---|
| 4,957,780 A | 9/1990 | Sarin et al. |
| 11,060,186 B2 | 7/2021 | Kong et al. |
| 2005/0072361 A1* | 4/2005 | Yang ............. C23C 14/246 427/248.1 |
| 2008/0268143 A1 | 10/2008 | Vahlas et al. |
| 2013/0217164 A1* | 8/2013 | Kang ............... C23C 14/12 118/500 |
| 2014/0109829 A1* | 4/2014 | Kim ............... C23C 14/243 118/712 |
| 2015/0221897 A1* | 8/2015 | Kako ............... B05B 17/00 118/712 |
| 2019/0032194 A2* | 1/2019 | Dieguez-Campo ..... C23C 14/56 |
| 2019/0085454 A1 | 3/2019 | Tompa et al. |

(Continued)

FOREIGN PATENT DOCUMENTS

WO    2011062471 A2    5/2011

OTHER PUBLICATIONS

Extended European Search Report for EP Application No. 23189826.3, dated Jan. 31, 2024, 9 pages.

(Continued)

*Primary Examiner* — Aiden Lee
(74) *Attorney, Agent, or Firm* — Kinney & Lange, P.A.

(57) ABSTRACT

A chemical vapor deposition system comprises a reactor including at least one wall extending between an inlet end and an outlet end, and an internal volume defined by the at least one wall, the inlet end, and the outlet end. The reactor further comprises a heat source in thermal communication with the internal volume, and a solid precursor container removably placed within the internal volume. The solid precursor container includes at least one internal cavity for holding an amount of the solid precursor, and an opening fluidly connecting the at least one internal cavity to the internal volume of the reactor. The solid precursor comprises at least one of aluminum, zirconium, hafnium, and a rare earth metallic element.

12 Claims, 5 Drawing Sheets

(56) References Cited

U.S. PATENT DOCUMENTS

2020/0328077 A1* 10/2020 Bush .................... C30B 23/066
2021/0139338 A1   5/2021 Natali et al.
2022/0195595 A1   6/2022 Zhu et al.

OTHER PUBLICATIONS

C. Vahlas, et al., "Liquid and Solid Precursor Delivery Systems in Gas Phase Processes", from Recent Patents on Materials Science 2015, 8, pp. 91-108.

* cited by examiner

IN-SITU SOLID CHEMICAL VAPOR DEPOSITION PRECURSOR DELIVERY

BACKGROUND

The present invention relates generally to ceramic matrix composites, and more particularly to the deposition of coatings thereupon.

Chemical vapor deposition (CVD) can be used to deposit a high-quality, uniform coating on a substrate using reactive precursors. The use of solid precursors in conventional CVD processes presents challenges due to inconsistent delivery and control of precursor vapor pressure to the deposition zone, especially in large volume reactors. Though room-temperature stable precursors are available, they must typically be heated to relatively high sublimation and deposition temperatures. At such temperatures, the precursor can prematurely react with other gases or precipitate along the delivery pathway before reaching the substrate. Metering the amount of solid precursor to regulate the rate of reaction for deposition using traditional chemical vapor deposition techniques can be impractical. Accordingly, improved methods to address these challenges are desirable.

SUMMARY

A chemical vapor deposition system comprises a reactor including at least one wall extending between an inlet end and an outlet end, and an internal volume defined by the at least one wall, the inlet end, and the outlet end. The reactor further comprises a heat source in thermal communication with the internal volume, and a solid precursor container removably placed within the internal volume. The solid precursor container includes at least one internal cavity for holding an amount of the solid precursor, and an opening fluidly connecting the at least one internal cavity to the internal volume of the reactor. The solid precursor comprises at least one of aluminum, zirconium, hafnium, and a rare earth metallic element.

A method of depositing a coating on a substrate comprises placing the substrate into an internal volume of a reactor, placing a solid precursor container adjacent the substrate in the internal volume of the reactor, the solid precursor container comprising an amount of solid precursor in an internal cavity, heating the internal volume of the reactor to at least a sublimation temperature of the solid precursor such that the solid precursor vaporizes into a vaporous precursor, the vaporous precursor exiting the internal cavity and depositing on the substrate, and flowing a reactant gas into the internal volume of the reactor such that an amount of the reactant gas reacts with the deposited vaporous precursor to form the coating.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

This disclosure presents various solid precursor containers for use in a chemical vapor deposition system. The container can be collocated with a substrate in a CVD reactor such that, upon sublimation, the less stable vaporous form of the precursor can deposit on the substrate before degrading or reacting in the gas phase. This allows for the deposition of a more uniform coating in less time for a given amount of solid precursor, potentially reducing costs related to materials (e.g., solid precursors) and processing time.

Figure 1:
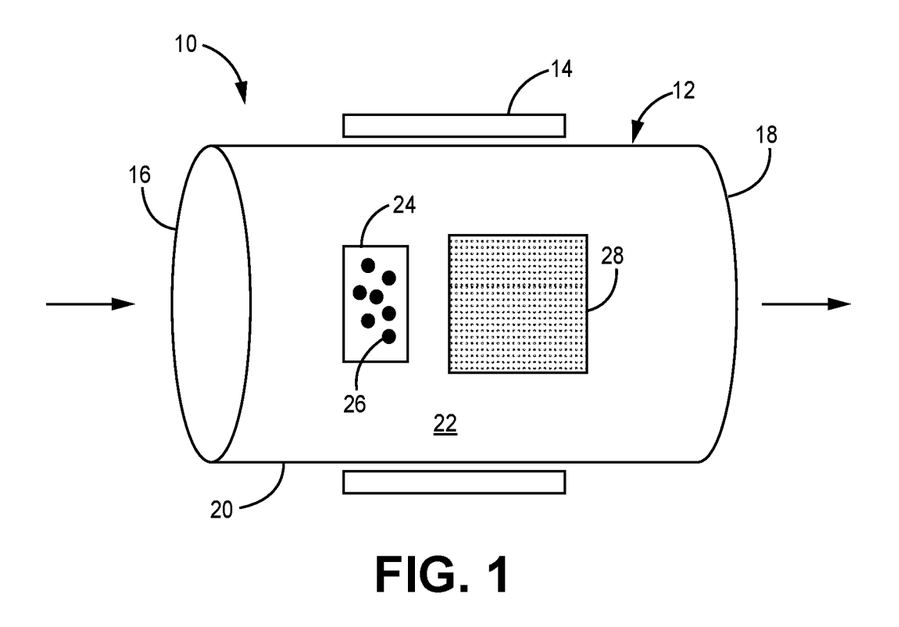
FIG. 1 is a simplified illustration of a CVD system using solid precursors as a reactant.

FIG. 1 is a schematic illustration of CVD system 10. System 10 can include reactor 12 and heat source 14 in thermal communication with reactor 12. Heat source 14 can be, for example, an induction or resistance furnace. Reactor 12 includes inlet end 16 for receiving a flow of gas, indicated by arrows, from one or more gas sources (not shown), and outlet end 18 for exhausting the flow of gas. The flow can include an inert carrier gas or a reactant gas, depending on the reaction used for deposition. Reactor 12 further includes one or more walls 20 which can define and/or extend between inlet end 16 and outlet end 18. Walls 20 further define internal volume 22. Container 24 can be removably placed into the internal volume 22 and is configured to hold an amount of solid precursor 26 in close physical proximity to substrate 28, which can also be removably placed into reactor 12 to receive one or more coatings therein. Solid precursor 26 can comprise one or more solid phase metals, organic compounds, and/or inorganic compounds containing aluminum (Al), zirconium (Zr), hafnium (Hf), and rare earth metallic elements. Solid precursor 26 can be in the form of a powder, pellets, tablets, etc. Substrate 28 can be a fibrous ceramic preform in an uncoated or partially coated state, or a densified ceramic matrix composite (CMC). Some embodiments of system 10 can further include a vacuum (not shown) in communication with reactor 12.

Figure 2:
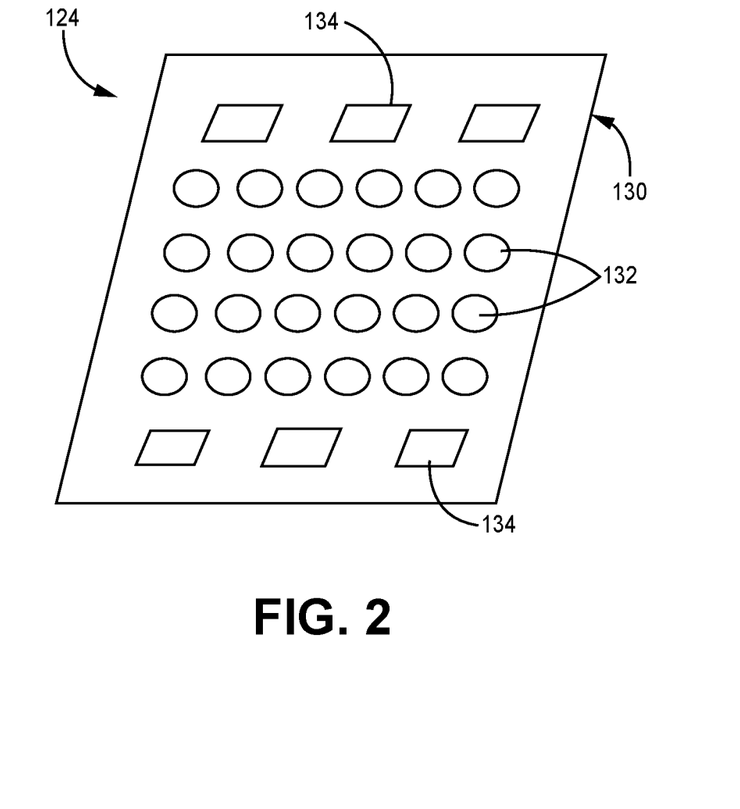
FIG. 2 is a simplified illustration of one embodiment of a solid precursor container.
Figure 3:
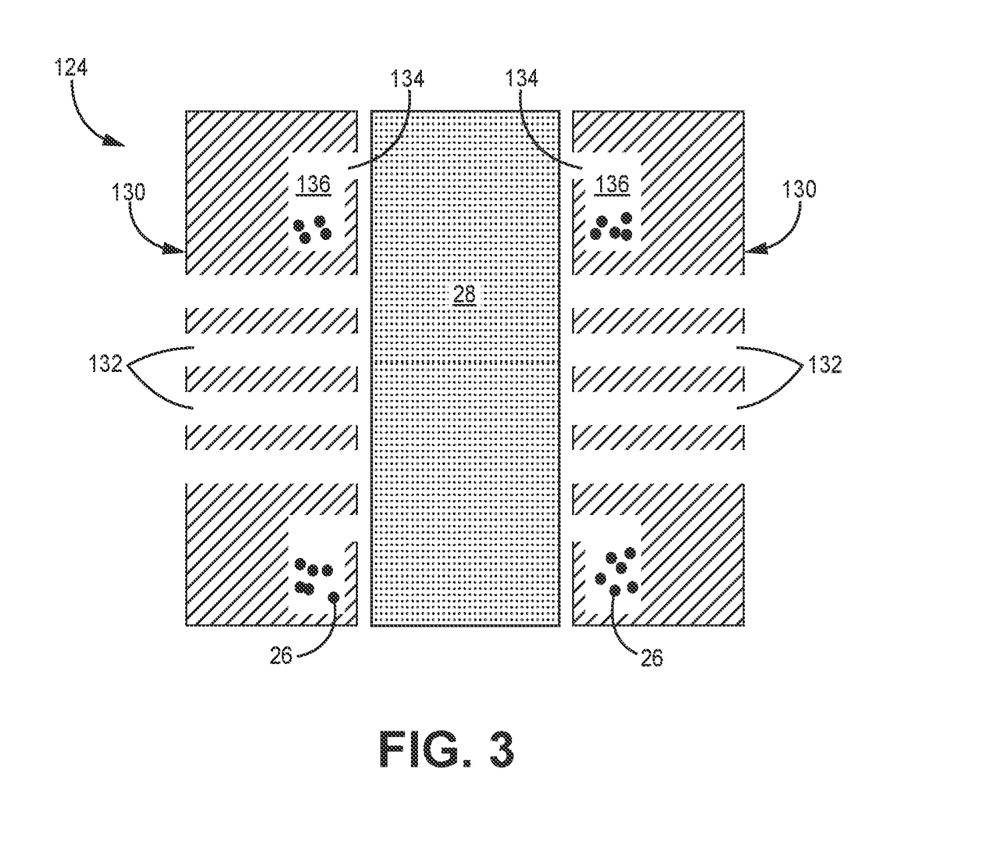
FIG. 3 is a simplified cross-sectional illustration of the container of FIG. 2 positioned adjacent a substrate.

FIG. 2 is a simplified side view of a first embodiment of a container, shown as tooling 124. FIG. 3 is a simplified cross-sectional view of substrate 28 mounted in tooling 124. FIGS. 2 and 3 are discussed together.

In the embodiment shown, tooling 124 can include one or more plates 130 for enclosing substrate 28 therebetween. Each plate 130 can include apertures 132, slots (i.e., openings) 134, and cavities 136 (shown and labeled in FIG. 3). Apertures 132 can extend fully through the thickness of plate 130 to allow reactant gases to reach substrate 28. Cavities 136 are disposed within the body of plate 130, and each slot 134 places the associated cavity 132 in fluid communication with the external environment (e.g., internal volume 22 of reactor 12). Each cavity 136 can hold an amount of solid precursor 26. The design of plates 130 with cavities 136 is such that solid precursor 26 can be positioned in close physical proximity to substrate 28, for example, such that the path length between solid precursor 26 and substrate 28 is 0 cm to 30 cm, and preferably, 0 cm to 10 cm. Tooling 124 can be similar to tooling (e.g., graphite tooling) used for retaining fibrous preforms during CVD, chemical vapor infiltration (CVI), or other deposition processes. In an alternative embodiment, tooling 124 need not enclose/surround substrate 28, rather, it can be configured as a base/platform upon which substrate 28 can be placed.

In operation of system 10 using container/tooling 124, substrate 28 can be mounted on/within tooling 124 and the resulting assembly placed into reactor 12, which is subsequently heated by heat source 14. In one embodiment, a vacuum source can create an active vacuum within reactor 12 during the deposition process, or alternatively, a desired pressure can be achieved within reactor 12 prior to the deposition process. One or a combination of gases (e.g., ammonia ($NH_3$), hydrogen ($H_2$), nitrogen ($N_2$), etc.) can be supplied to the heated reactor 12 via inlet end 16. Solid precursor 26 within tooling 124 begins to vaporize at the material-specific sublimation temperature, or through a gradual increase of vapor pressure, depending on the particular solid precursor 26 and reactor 12 conditions. The resulting vaporous precursor can exit cavities 136 via slots and deposit on substrate 28. Because of the close physical proximity of solid precursor 26 to substrate 28, the vaporous precursor can deposit on substrate 28 before decomposing or reacting in the gas phase.

Figure 4A:
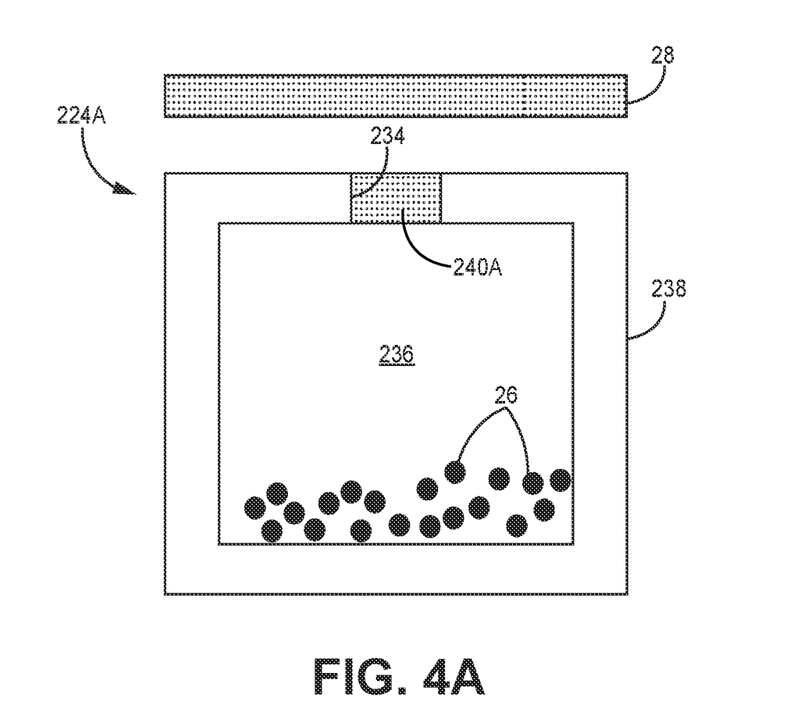
FIGS. 4A and 4B are simplified illustrations of second and third alternative embodiments, respectively, of the solid precursor container.
Figure 4B:
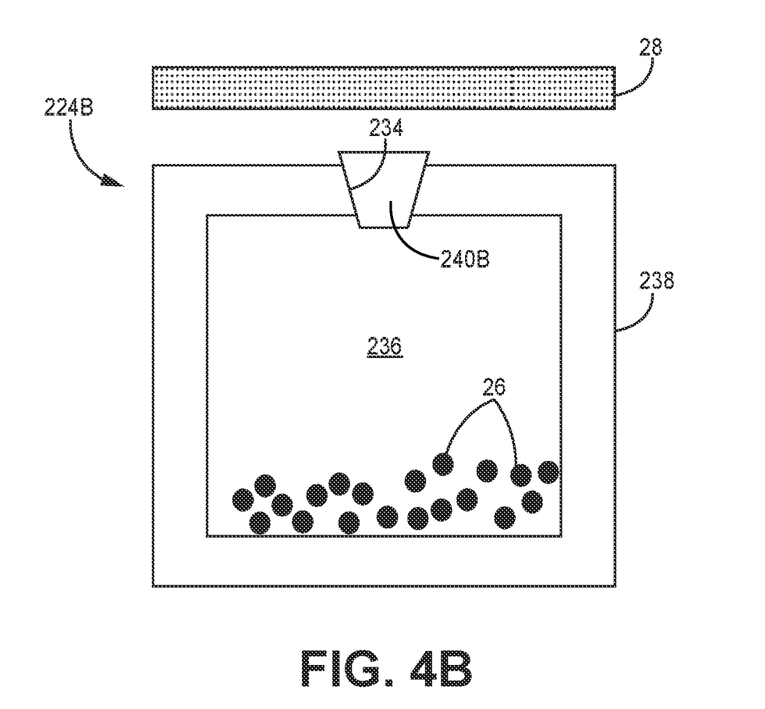

FIG. 4A is a simplified illustration of a second embodiment of a container, shown as controlled release cell 224A. FIG. 4B is a simplified illustration of alternative controlled release cell 224B. FIGS. 4A and 4B are discussed together.

Cells 224A and 224B are substantially similar, each having an internal cavity 236 defined by a plurality of walls 238. Cavity 236 can hold an amount of solid substrate 26. At least one sealable opening 234 in one wall 238 places cavity 236 in flow communication with the external environment. Cells 224A and 224B differ in the type of plug, 240A and 240B, respectively, used to seal openings 234. Plug 240A can be formed from a polymer material and designed to at least partially decompose at a particular temperature to expose some or all of opening 236. Plug 240B can be a pressure relief valve configured to dislodge partially or completely from opening 234 when cavity 236 reaches a particular vapor pressure. The use of cells 224A and/or 224B may be preferred in embodiments in which tooling is not necessary for preform (i.e., substrate 28) processing.

System 10 with cells 224A and 224B operates substantially similarly to the process described above with respect to tooling 124. Either of cells 224A or 224B containing an amount of solid precursor 26 can be placed in reactor 12, optimally, such that the wall 238 with opening 234 is closest to substrate 28. As shown in FIGS. 4A and 4B, cells 224A and 224B, respectively, are placed below substrate 28 with opening 234 in the uppermost wall 238. In such position, the path length between solid precursor 26 and substrate 28 can range from 0 cm to 30 cm, and preferably, 0 cm to 10 cm. With respect to cell 224A, as reactor 12 is heated and the temperature increases, solid precursor 26 can begin to vaporize at the corresponding sublimation temperature and/or increase in vapor pressure. Subsequently and/or concurrently in some embodiments, plug 240A can begin to decompose, allowing vaporous precursor to exit cavity 236 and deposit on the adjacent substrate 28. With respect to cell 224B, as the temperature increases and solid precursor 26 vaporizes, the vapor pressure within cavity 236 builds until reaching a pressure at which plug 240B moves partially or fully from opening 234, allowing vaporous precursor to exit cavity 236 and deposit on the adjacent substrate 28.

Some exemplary reactions of various solid precursors 26 are as follows: a coating comprising aluminum nitride (AlN) can be deposited by reacting solid aluminum acetylacetonate ($C_{15}H_{21}AlO_6$) with gaseous $NH_3$. Aluminum acetylacetonate begins to sublime around 150° C. A coating comprising zirconium nitride (ZrN) and/or hafnium nitride (HfN) can be deposited by reacting solid zirconium tetrachloride ($ZrCl_4$) and/or hafnium tetrachloride ($HfCl_4$) with gaseous $NH_3$. The Zr and Hf-based solid precursors 26 begin to sublime above 300° C. In general, exemplary solid precursors 26 can begin to sublime between 100° C. and 400° C., although other temperatures are contemplated herein. In an alternative embodiment, solid precursor 26 can be a metal in a pure form rather than as part of a chemical compound.

Using either tooling 124 or cells 224A, 224B, system 10 can be used to deposit one or more interface coatings on, for example, a layer of boron nitride (BN) already deposited on a fibrous preform. In an operating environment, the deposited coating comprising any of Al, Zr, Hf, etc., can act as a glass-modifier. More specifically, as the BN and silicon carbide (SiC) of the matrix oxidizes to form a borosilicate and silica glass, the metallic elements can interact with borosilicate and/or silica to form a more stable network of metallic-silicate glass. Such interactions can help prevent fiber degradation and extend the life of the CMC. System 10 can alternatively and/or additionally be used to apply protective coatings to a CMC (e.g., SiC/SiC CMC). Such coatings can include environmental barrier coatings and/or thermal barrier coatings. System 10 can be used to sequentially and/or alternately apply coatings via CVI (e.g., interface coatings of BN, SiC, etc.) and via CVD, by varying process parameters, configuration of reactor 12, etc.

A CMC component formed with the disclosed fiber coating systems can be incorporated into aerospace, maritime, or industrial equipment, to name a few, non-limiting examples.

Discussion of Possible Embodiments

The following are non-exclusive descriptions of possible embodiments of the present invention.

A chemical vapor deposition system comprises a reactor including at least one wall extending between an inlet end and an outlet end, and an internal volume defined by the at least one wall, the inlet end, and the outlet end. The reactor further comprises a heat source in thermal communication with the internal volume, and a solid precursor container removably placed within the internal volume. The solid precursor container includes at least one internal cavity for holding an amount of the solid precursor, and an opening fluidly connecting the at least one internal cavity to the internal volume of the reactor. The solid precursor comprises at least one of aluminum, zirconium, hafnium, and a rare earth metallic element.

The system of the preceding paragraph can optionally include, additionally and/or alternatively, any one or more of the following features, configurations and/or additional components:

The above system can further include a substrate removably placed within the internal volume of the reactor and adjacent the solid precursor container.

In any of the above systems, the solid precursor container can be tooling for at least partially enclosing the substrate, the tooling including a first plate and a second plate.

In any of the above systems, the at least one cavity can include a first cavity disposed in a body of the first plate, and a second cavity disposed within a body of the second plate.

In any of the above systems, each of the first plate and the second plate can further include a plurality of apertures extending through a thickness of the respective first plate and second plate.

In any of the above systems, the solid precursor container can be a controlled release container including a plurality of walls defining the internal cavity, the opening being disposed within one of the plurality of walls, and a removable plug within the opening.

In any of the above systems, the plug can be formed from a thermally decomposable polymer material.

In any of the above systems, the plug can be a pressure relief valve.

In any of the above systems, the opening can face the substrate.

In any of the above systems, the solid precursor can be formed as one of a powder, a pellet, and a tablet.

A method of depositing a coating on a substrate comprises placing the substrate into an internal volume of a reactor, placing a solid precursor container adjacent the substrate in the internal volume of the reactor, the solid precursor container comprising an amount of solid precursor in an internal cavity, heating the internal volume of the reactor to at least a sublimation temperature of the solid precursor such that the solid precursor vaporizes into a vaporous precursor, the vaporous precursor exiting the internal cavity and depositing on the substrate, and flowing a reactant gas into the internal volume of the reactor such that an amount of the reactant gas reacts with the deposited vaporous precursor to form the coating.

The method of the preceding paragraph can optionally include, additionally and/or alternatively, any one or more of the following features, configurations and/or additional components:

In the above method, the substrate can be a fibrous ceramic preform.

In any of the above methods, the solid precursor can include at least one of aluminum, zirconium, hafnium, and a rare earth metallic element.

In any of the above methods, the reactant gas can include at least one of ammonia, hydrogen, and nitrogen.

In any of the above methods, the step of placing the solid precursor container adjacent the substrate can include mounting the substrate on tooling, the tooling comprising a plurality of plates.

In any of the above methods, the step of placing the solid precursor container adjacent the substrate can include placing a controlled release container adjacent the substrate such that an opening of the controlled release container is adjacent the substrate.

In any of the above methods, a plug can be removably placed within the opening.

In any of the above methods, the plug can include a thermally decomposable polymer material.

In any of the above methods, the plug can include a pressure relief valve.

In any of the above methods, the sublimation temperature can range from 120° C. to 400° C.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A chemical vapor deposition system comprising:
   a reactor comprising;
      at least one wall extending between an inlet end and an outlet end; and
      an internal volume defined by the at least one wall, the inlet end, and the outlet end;
   a heat source in thermal communication with the internal volume; and
   a solid precursor container removably placed within the internal volume, wherein the solid precursor container is a tooling for at least partially enclosing a substrate, the solid precursor container comprising:
      a first plate comprising a first internal cavity configured to hold an amount of a solid precursor and a first opening fluidly connecting the first internal cavity to the internal volume of the reactor; and
      a second plate, wherein the first plate and the second plate are configured to at least partially enclose the substrate therebetween,
      wherein each of the first plate and the second plate further comprises a plurality of apertures extending fully through a thickness of the respective first plate and second plate, each aperture open to the internal volume at a first end and open to face the substrate at a second end opposite the first end.

2. The system of claim 1, wherein the solid precursor is formed as one of a powder, a pellet, and a tablet.

3. The system of claim 1, wherein the second plate comprises a second internal cavity configured to hold an amount of the solid precursor and a second opening fluidly connecting the second internal cavity to the internal volume of the reactor.

4. The system of claim 3, wherein the first internal cavity is disposed in a body of the first plate, and wherein the second internal cavity is disposed within a body of the second plate.

5. The system of claim 3, wherein the first opening is disposed to face the substrate and wherein the second opening is disposed to face the substrate.

6. The system of claim 3, further comprising:
   the solid precursor disposed in the first internal cavity and the second internal cavity, wherein the solid precursor comprises at least one of aluminum, zirconium, hafnium, and a rare earth metallic element.

7. A method of depositing a coating on a substrate using the chemical vapor deposition system of claim 1, the method comprising:
   placing the substrate and the solid precursor container in the internal volume of the reactor,
      wherein the first plate and the second plate of the solid precursor container partially enclose the substrate therebetween;
   heating the internal volume of the reactor to at least a sublimation temperature of the solid precursor such that the solid precursor vaporizes into a vaporous precursor, the vaporous precursor exiting the internal cavity and depositing on the substrate; and
   flowing a reactant gas into the internal volume of the reactor such that an amount of the reactant gas reacts with the deposited vaporous precursor to form the coating.

8. The method of claim 7, wherein the substrate is a fibrous ceramic preform.

9. The method of claim 7, wherein the solid precursor comprises at least one of aluminum, zirconium, hafnium, and a rare earth metal.

10. The method of claim 9, wherein the reactant gas comprises at least one of ammonia, hydrogen, and nitrogen.

11. The method of claim 7, wherein the sublimation temperature ranges from 100° C. to 400° C.

12. The method of claim 7, wherein the second plate comprises a second internal cavity configured to hold an amount of the solid precursor and a second opening fluidly connecting the second internal cavity to the internal volume of the reactor.

* * * * *